(12) United States Patent
DeCia et al.

(10) Patent No.: US 9,850,839 B2
(45) Date of Patent: Dec. 26, 2017

(54) SYSTEM AND METHOD FOR HILL ASCENT SPEED ASSISTANCE

(71) Applicant: Ford Global Technologies, LLC, Dearborn, MI (US)

(72) Inventors: Nunzio DeCia, Northville, MI (US); Stephen Jay Orris, Jr., New Boston, MI (US); David A. Herman, Southfield, MI (US); Richard D. Bridgewater, Dearborn, MI (US); Nicholas Alexander Scheufler, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/010,723

(22) Filed: Jan. 29, 2016

(65) Prior Publication Data
US 2017/0218871 A1    Aug. 3, 2017

(51) Int. Cl.
| G06F 17/00 | (2006.01) |
| F02D 41/10 | (2006.01) |
| F02D 41/26 | (2006.01) |
| H04L 12/40 | (2006.01) |
| H04L 12/26 | (2006.01) |

(52) U.S. Cl.
CPC ............ *F02D 41/10* (2013.01); *F02D 41/26* (2013.01); *H04L 12/40* (2013.01); *F02D 2200/50* (2013.01); *F02D 2200/702* (2013.01); *H04L 43/0811* (2013.01); *H04L 2012/40215* (2013.01)

(58) Field of Classification Search
CPC ...... F02D 41/10; F02D 41/26; F02D 2200/50; F02D 2200/702; H04L 12/40; H04L 43/0811; H04L 2012/40215
USPC .............................................. 701/80, 84, 93
See application file for complete search history.

(56) References Cited

U.S. PATENT DOCUMENTS

| 4,911,259 A | 3/1990 | Dogahara et al. |
| 5,329,454 A | 7/1994 | Takada et al. |
| 5,995,895 A | 11/1999 | Watt et al. |

(Continued)

FOREIGN PATENT DOCUMENTS

| EP | 1787848 A | 5/2007 |
| EP | 002048748 A2 * | 4/2009 |

(Continued)

OTHER PUBLICATIONS

Christian Ress et al., ADASIS Protocol for Advanced In-Vehicle Applications, The ADASIS Forum.

(Continued)

*Primary Examiner* — Gertrude Arthur Jeanglaude
(74) *Attorney, Agent, or Firm* — James P. Muraff; Neal, Gerber & Eisenberg LLP

(57) ABSTRACT

A method and apparatus to assist a vehicle ascending a hill are disclosed. An example apparatus includes a trailer connection component configured to determine whether a trailer is connected to the vehicle. The example apparatus also includes a road geometry component configured to determine a slope of a road on which the vehicle is driving. The example apparatus also includes a vehicle payload component configured to determine a gross vehicle weight of the vehicle. The example apparatus also includes a throttle adjuster configured to adjust a throttle based on the gross vehicle weight to maintain a set speed.

19 Claims, 4 Drawing Sheets

(56) References Cited

U.S. PATENT DOCUMENTS

| | | | |
|---|---|---|---|
| 6,289,279 B1 * | 9/2001 | Ito | G01C 21/206 342/357.34 |
| 6,655,222 B2 | 12/2003 | Hessmert et al. | |
| 8,793,035 B2 | 7/2014 | Yu et al. | |
| 2003/0060961 A1 | 3/2003 | Ishizu et al. | |
| 2009/0216415 A1 | 8/2009 | Iwatsuki et al. | |
| 2010/0049400 A1 | 2/2010 | Duraiswamy et al. | |
| 2010/0332100 A1 | 12/2010 | Faggetter | |
| 2011/0276216 A1 | 11/2011 | Vaughan | |
| 2014/0032068 A1 | 1/2014 | Nilsson et al. | |
| 2015/0197247 A1 | 7/2015 | Ichinokawa | |

FOREIGN PATENT DOCUMENTS

| | | | |
|---|---|---|---|
| FR | 2877448 A | 5/2006 |
| JP | 2008265602 A | 11/2008 |
| WO | WO 2014126523 A | 8/2014 |

OTHER PUBLICATIONS

Search Report dated Jun. 30, 2017 for GB Patent Application No. GB1701415.0 (4 Pages).

* cited by examiner

SYSTEM AND METHOD FOR HILL ASCENT SPEED ASSISTANCE

TECHNICAL FIELD

The present disclosure generally relates to a powertrain control of a vehicle and, more specifically, systems and methods for hill ascent speed assistance.

BACKGROUND

Vehicle cruise control systems have evolved over time to include adaptive features such as using distance and speed of another vehicle in front of the particular vehicle to be more efficient when managing variable traffic flow. However, the vehicle cruise control systems do not perform well when the road geometry changes. As the vehicle ascends a hill, the vehicle slows noticeably as it fights the forces of gravity to maintain speed. The vehicle cruise control system increases the throttle to compensate and maintain a set speed. Because the vehicle cruise control system is reacting to the road geometry changes, the transmission must shift and greatly increase the engine revolutions per minute (RPM) to return the vehicle to the set speed. This phenomenon is particularly noticeable when the vehicle is towing a trailer. Often, the vehicle will slow by five miles per hour (MPH) or more before the vehicle cruise control system reacts. As a result, of greatly increasing the throttle, strain is exerted on the powertrain of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide systems and methods to assist a vehicle ascending a hill. According to one embodiment, a vehicle includes a trailer connection component configured to determine whether a trailer is connected to the vehicle. The example vehicle also includes a road geometry component configured to determine a slope of a road on which the vehicle is driving. The example vehicle also includes a vehicle payload component configured to determine a gross vehicle weight of the vehicle. The example vehicle also includes a throttle adjuster configured to adjust a throttle based on the gross vehicle weight to maintain a set speed.

According to another embodiment, an example method includes determining a connection status of a trailer. The example method also includes determining a slope of a road ahead of the vehicle. The example method also includes calculating an effective weight of the vehicle based on (i) vehicle dynamics data and (ii) the connection status of the trailer; and the example method also includes adjusting a throttle based on the effective weight of the vehicle and a grade of the slope to maintain a set speed when the vehicle is traversing the slope

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
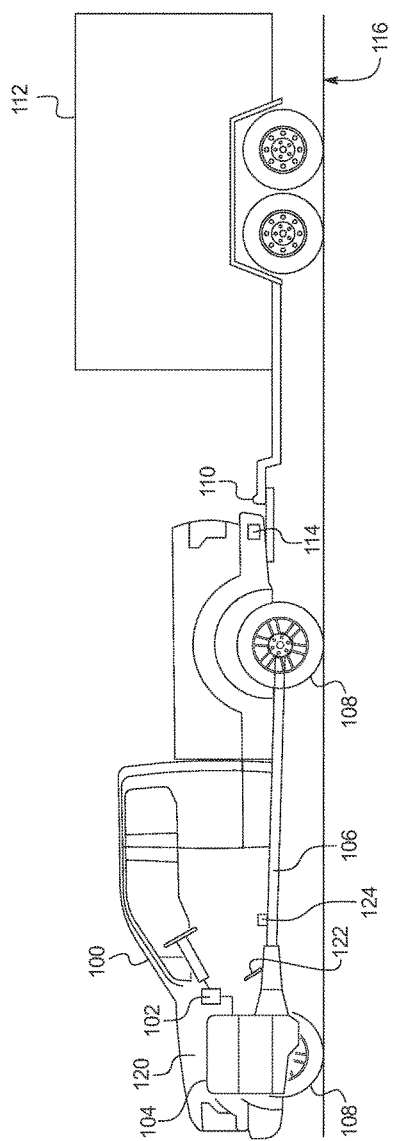
FIGS. 1A and 1B illustrate a vehicle with a hill ascent regulator in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Figure 1B:
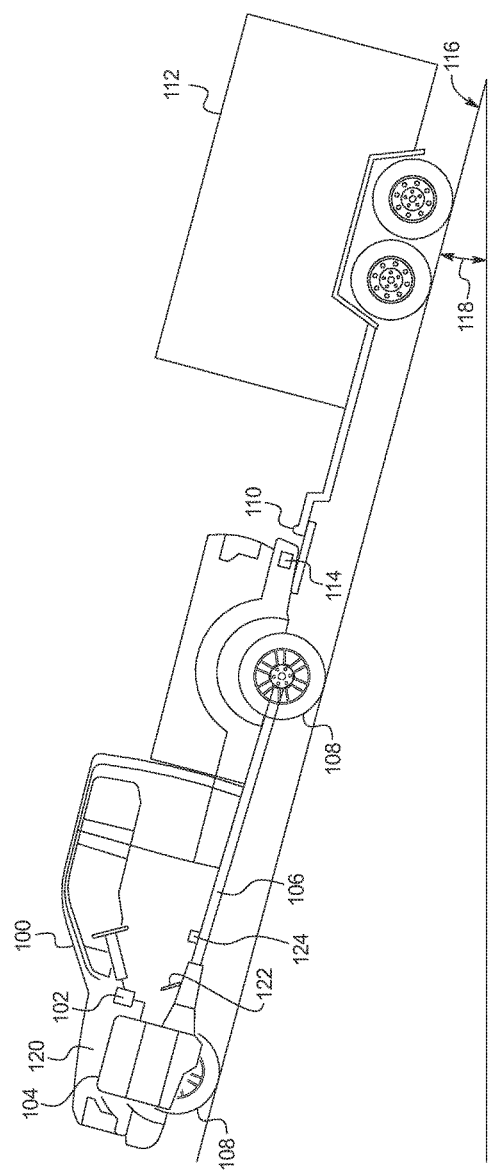

FIGS. 1A and 1B illustrate a vehicle 100 with a hill ascent regulator 102 in accordance with the teachings of this disclosure. The hill ascent regulator 102 anticipates the changes in torque to maintain a current speed of the vehicle. The vehicle 100 is any type of road vehicle (e.g., cars, trucks, motorcycles, mopeds, etc.). The vehicle 100 may be a standard gasoline powered vehicle, a hybrid vehicle, an electric vehicle, a fuel cell vehicle, or any other type of suitable vehicle. The vehicle 100 includes a powertrain with an engine 104, a transmission (not shown), a suspension (not shown), a driveshaft 106, and wheels 108. The powertrain generates power via the engine 104 and manages the power as the power is delivered to the wheels 108. The vehicle 100 also includes standard features (not shown) such as a dashboard, adjustable seats, one or more batteries, an HVAC system including a compressor and electronic expansion valve, a windshield, doors, windows, seatbelts, airbags, and tires.

In some examples, the vehicle 100 includes a hitch 110 that allows a trailer 112 to be physically coupled to the vehicle 100. The hitch 110 includes a hitch connector 114 that facilitates the trailer 112 being communicatively coupled to a control area network (CAN) bus (described below) of the vehicle 100. When the trailer 112 is connected to the CAN bus via the hitch connector 114, the vehicle 100 can control the systems of the trailer 112, such as lights, brakes, and stability control, etc. In the illustrated example of FIGS. 1A and 1B, the trailer 112 is coupled to the vehicle 100. The hill ascent regulator 102 also anticipates the changes in the torque to maintain the current speed of the vehicle when the trailer 112 is not coupled to the vehicle 100.

In the illustrated example, the vehicle 100 is driving on a road 116 that has a slope 118 (sometimes referred to as a gradient or a pitch). The slope 118 is measured in an angle of inclination compared to the horizon or a grade, which is a hundred times the tangent of the angle of inclination compared to the horizon. The slope may be upwards (the angle of inclination and the grade are positive) or the slope may be downwards (the angle of inclination and the grade are negative). In the example illustrated in FIG. 1A, the road 116 is flat (that is, the grade of the slope 118 is zero). In the example illustrated in FIG. 1B, the slope 118 of the road 116 is not flat. For example, the slope 118 of the road 116 may have a grade of forty. The gradient of the slope 118 may change such that the torque to maintain the current speed changes.

The vehicle 100 includes throttle-by-wire and/or cruise control. The cruise control facilitates the driver setting a desired speed, and maintains the set speed. The cruise control receives speed data from sensor(s) (such as a speedometer, a wheel speed sensor, etc). The cruise control uses the speed data to calculate the electronic signal to send to the throttle control 120 in order to maintain the set speed. As disclosed in more detail below, in an example embodiment, the hill ascent regulator 102 anticipates changes in torque to maintain the current speed while traversing the slope 118 of the road 116 ahead of the vehicle 100. In some examples, the hill ascent regulator 102 also anticipates changes in the torque to maintain the current speed when the slope 118 of the road 116 ahead of the vehicle 100 changes from a negative gradient to a relatively flat gradient. The hill ascent regulator 102 instructs the throttle control 120 to adjust the torque supplied by the engine 104 before the vehicle 100 reaches in the change in the slope 118. In such a manner, when the vehicle 100 reaches change in the slope 118, the cruise control maintains the set speed. In some example embodiments, the hill ascent regulator 102 is part of the cruise control. Alternatively, in some embodiments, the hill ascent regulator 102 is separate from the cruise control.

Additionally, throttle-by-wire uses one or more sensors in conjunction with an acceleration pedal 122 to convert a mechanical force applied to the acceleration pedal 122 to an electrical signal. The mechanical force is measured by how far the acceleration pedal 122 is pushed. A throttle control 120 uses the electrical signal to control the throttle. The throttle regulates an amount of air that enters the engine 104, which controls the power generated by the engine 104. The throttle control 120 may dynamically change the mechanical-force-to-throttle ratio to, for example, control the how responsive the acceleration pedal 122 feels when a driver presses it. For example, a higher mechanical-force-to-throttle ratio feels more sluggish, and a lower higher mechanical-force-to-throttle ratio feels more sensitive. As disclosed in more detail below, in an example embodiment, the hill ascent regulator 102 anticipates changes in torque required to maintain a current speed when the gradient of the road is going to change and instructs the throttle control 120 to adjust the mechanical-force-to-throttle ratio to assist the driver while not requiring the driver to adjust the position of the acceleration pedal 122.

Figure 2:
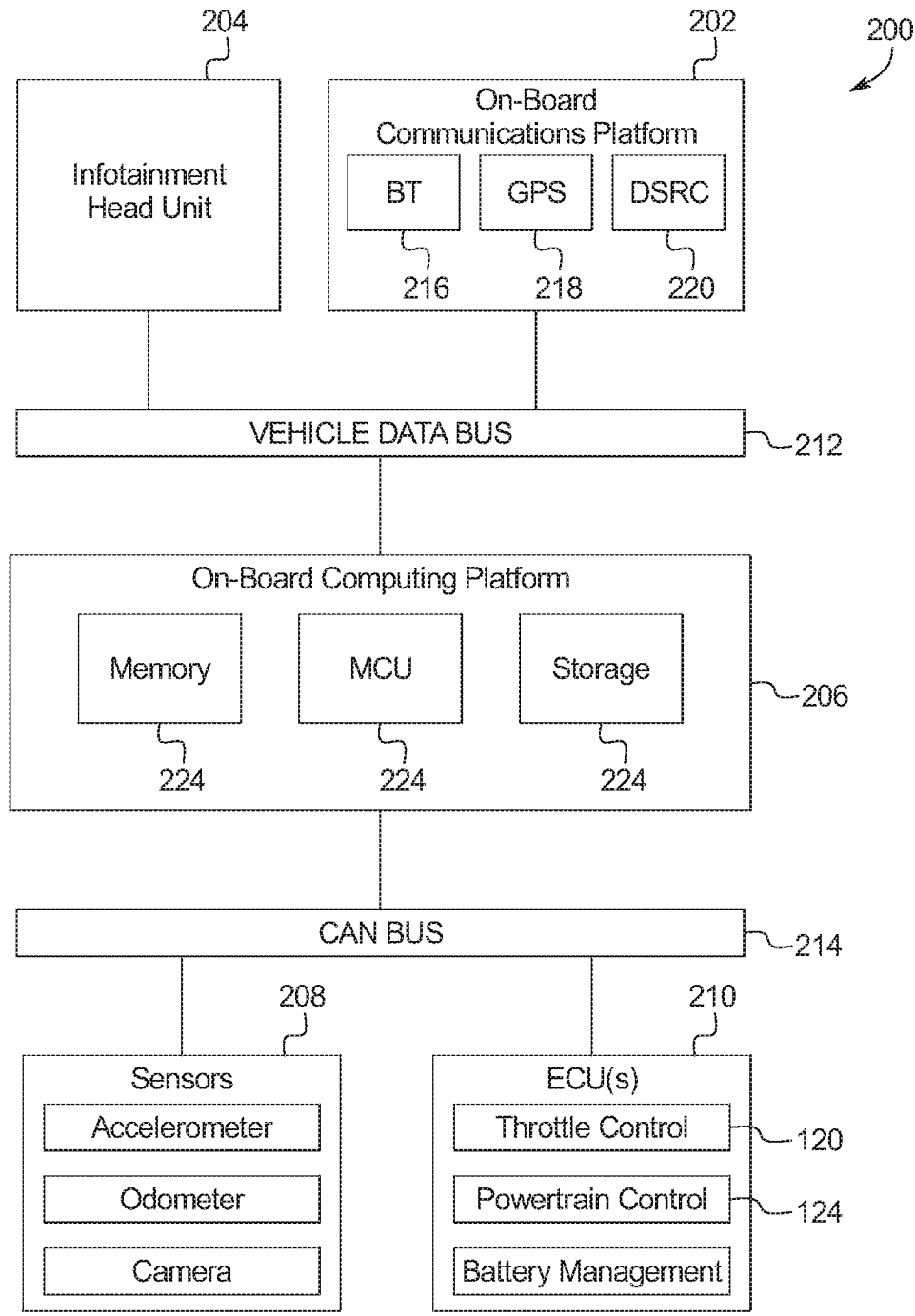
FIG. 2 is a block diagram illustrating electronic components of the vehicle of FIGS. 1A and 1B.

FIG. 2 is a block diagram illustrating electronic components 200 of the vehicle 100 of FIG. 1. The electronic components 200 include an example on-board communications platform 202, an example infotainment head unit 204, an on-board computing platform 206, example sensors 208, example electronic control units (ECUs) 210, a vehicle data bus 212, and a controller area network (CAN) bus 214.

The on-board communications platform 202 includes wired or wireless network interfaces to enable communication with external networks. The on-board communications platform 202 also includes hardware (e.g., processors, memory, storage, antenna, etc.) and software to control the wired or wireless network interfaces. In the illustrated example, the on-board communications platform 202 includes a Bluetooth® controller 216, a GPS receiver 218, and a DSRC controller 220. The on-board communications platform 202 may also include controllers for other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 202 may also include a wired or wireless interface to enable direct communication with an electronic device (such as a smart phone, a tablet computer, a laptop, etc.).

The infotainment head unit 204 provides an interface between the vehicle 100 and a user (e.g., a driver, a passenger, etc.). The infotainment head unit 204 includes digital and/or analog controls (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a display (e.g., a liquid crystal display ("LCD"), an organic light emitting diode ("OLED") display, a flat panel display, a solid state display, or a heads-up display), and speakers.

The on-board computing platform 206 includes a processor or controller 224, memory 226, and storage 228. The processor or controller 224 may be any suitable processing device or set of processing devices such as, but not limited to: a microprocessor, a microcontroller-based platform, a suitable integrated circuit, or one or more application-specific integrated circuits (ASICs). The memory 226 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 226 includes multiple kinds of memory, particularly volatile memory add non-volatile memory. The storage 228 may include a hard drive; a solid state hard drive; or a physical disk such as a DVD.

The memory 226 and the storage 228 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 226, the computer readable medium, and/or within the processor 224 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 208 may be arranged in and around the vehicle 100 in any suitable fashion. The sensors 208 may include camera(s), sonar, LiDAR, radar, optical sensors, or infrared devices configured to measure properties around the exterior of the vehicle 100. Additionally, some sensors 208 may be mounted inside the passenger compartment of the vehicle 100, in the engine compartment of the vehicle 100, and on or around the powertrain of the vehicle 100 to measure properties in the interior of the vehicle 100. For example, such sensors 208 may include accelerometers, wheel tachometers, yaw rate sensors, cameras, microphones, and thermistors, etc.

The ECUs 210 monitor and control the low-level systems of the vehicle 100. For example, the ECUs 210 may control and/or monitor the lighting system, the engine, the power locks, the power windows, the power train, the HVAC system, and the battery management, etc. In the illustrated example, the ECU(s) include the electronic horizon unit, the throttle control 120, and cruise control. The ECU(s) communicate properties to and/or receive commands from the on-board computing platform 206.

The vehicle data bus 212 communicatively couples the on-board communications platform 202, the infotainment head unit 204, and the on-board computing platform 206. The vehicle data bus 212 may be an Ethernet network. The CAN bus 214 communicatively couples the sensors 208, the ECUs 210, the on-board computing platform 206, and other devices connected to the CAN bus 214. The CAN bus protocol is defined by International Standards Organization (ISO) 11898-1. In some examples, the on-board computing platform 206 communicatively isolates the vehicle data bus 212 and the CAN bus 214 (e.g., via firewalls, message brokers, etc.). Alternatively, in some examples, the vehicle data bus 212 and the CAN bus 214 may be the same data bus.

Figure 3:
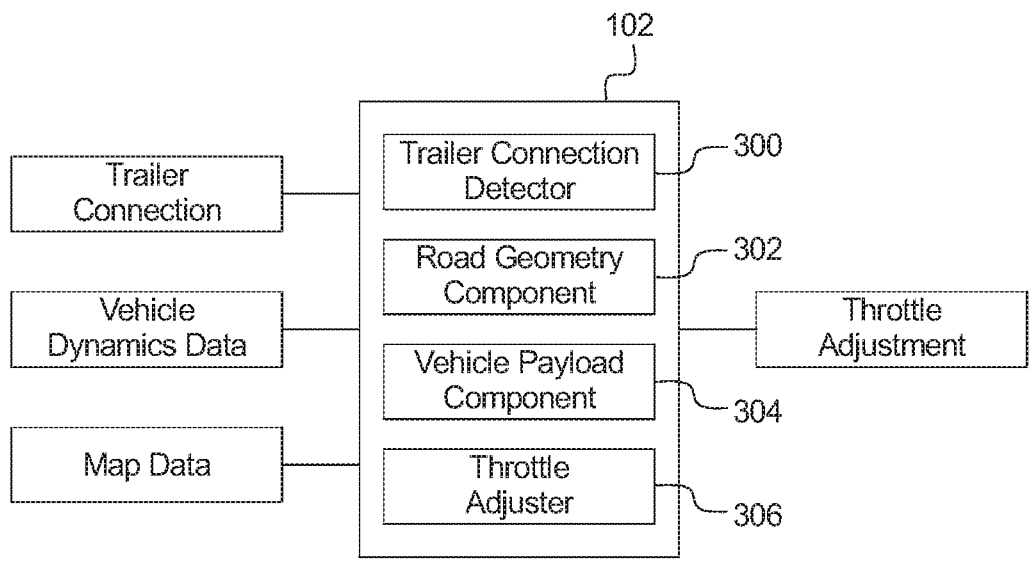
FIG. 3 is a block diagram of the hill ascent regulator of FIG. 1.

FIG. 3 is a block diagram of the hill ascent regulator 102 of FIG. 1. The hill ascent regulator 102 is configured to (i) anticipate changes in torque to maintain the speed of the vehicle when the gradient of the road is going to change, and (ii) adjust the throttle and/or the powertrain control to supply the torque before the gradient of the road changes. The hill ascent regulator 102 includes (a) a trailer connection detector 300 configured to detect when a trailer 112 is connected, via the hitch 110, to the vehicle 100; (b) a road geometry component 302 configured to determine the slope 118 of an upcoming part of the road 116 on which the vehicle 100 is driving; (c) a vehicle payload component 304 configured to determine an effective Gross Vehicle Weight (GVW) (or Gross Vehicle Mass (GVM)) of the vehicle 100; and (d) a throttle adjuster 306 configured to adjust a throttle of the vehicle 100 based on the effective GVW/GVM to maintain the speed of the vehicle 100.

The trailer connection detector 300 of the hill ascent regulator 102 detects when the trailer 112 is connected to the hitch 110 of the vehicle 100. When the trailer 112 is connected, the hitch connector 114 sends a message on the CAN bus 214. The trailer connection detector 300 detects the message on the CAN bus 214. In some examples, the trailer 112 also communicates information about the trailer 112 on the CAN bus 214, such as the GVW/GVM of the trailer 112.

The road geometry component 302 of the hill ascent regulator 102 receives map data representative of the characteristics of the road on which the vehicle 100 is driving from an electronic horizon unit. The map data includes information of the road 116 up to a distance ahead (such as one kilometer or 0.62 miles) of the current location of the vehicle 100. For example, the map data may include turn angles, road gradients, road features (such as tunnels, bridges, etc.), and positions (e.g., coordinates from a global positioning system (GPS), and speed limits, etc), etc. In certain example embodiments, the road geometry component 302 receives the map data from the electronic horizon unit which is compatible with the Advanced Driver Assistance Systems (ADAS) protocol maintained by the ADASIS Forum. More information on the ADAS protocol is available in the "ADAS Protocol for Advanced In-Vehicle Applications" (available at http://durekovic.com/publications/documents/ADASISv2%20ITS%20NY%20Paper%20Final.pdf), which is hereby incorporated by reference in its entirety. The road geometry component 302 uses the map data to determine slope data, which includes: (a) whether there is a change in the road gradient ahead of the vehicle 100; (b) the slope of the change in the road gradient; and (c) if within the range of the map data, the crest of the slope. For example, the road geometry component 302 may determine that there is a slope with a 20% grade (11.31 degree angle) 250 meters (0.16 miles) ahead of the vehicle 100 that crests after 500 meters (0.31 miles).

The vehicle payload component 304 of the hill ascent regulator 102 receives vehicle dynamics data from the sensors 208 and/or the ECUs 210 of the vehicle 100. The vehicle dynamics data includes a base GVM/GVM (the GVM/GVM as built in the factory) for the vehicle 100, the speed of the vehicle 100, fuel level data, the torque applied to the wheels 108, and the pitch and yaw of the vehicle 100, etc. The vehicle payload component 304 also receives trailer connection data from trailer connection detector 300 indicating whether the trailer 112 is attached. The vehicle payload component 304 calculates the effective GVW/GVM of the vehicle 100 based on the vehicle dynamics data, the trailer connection data, and a vehicle model. The effective GVW/GVM is the GVW/GVM of the vehicle 100 plus other factors (such as aerodynamic drag, inertia, rolling resistance of the tires, etc.) that affect what torque to apply to the wheels 108 of the vehicle 100 to maintain the current speed. In some examples, even when the trailer 112 is not connected, passengers and/or cargo in the vehicle 100 may weight enough to affect the vehicle dynamics data, and thus affect the calculation of the effective GVW/GVM of the vehicle. For example, a vehicle 100 with thirty cinder blocks as cargo would need more torque than the same vehicle 100 with just a driver. In some examples, when the trailer connection detector 300 indicates that the trailer 112 is connected, the vehicle payload component 304 includes the GVW/GVM of the trailer 112 when calculating the effective GVW/GVM. The vehicle model provides a relationship of the vehicle dynamics data and the GVW/GVM of the vehicle 100 to the effective GVW/GVM. For example, the model may be based on a calculated expected torque to move the vehicle 100 with the base GVW/GVM and a full fuel tank. In such an example, deviations between the expected torque and the actual torque to move the vehicle 100, as measured by the vehicle dynamics data, are used to calculate the effective GVW/GVM.

The throttle adjuster 306 of the hill ascent regulator 102 sends instructions to (i) the throttle control 120 to adjust the throttle and/or (ii) a powertrain control 124 to adjust the torque applied to the wheels 108. The throttle adjuster 306 receives the slope data from the road geometry component 302 and the effective GVW/GVM from the vehicle payload component 304. The throttle adjuster 306 supplies (a) the effective GVW/GVM and (b) the slope data to a torque demand model (sometimes referred to as an "engine torque map"). The torque demand model relates the torque delivered by the engine 104 to the speed of the engine 104 and the position of the throttle. The torque demand model determines the torque to be applied to the wheels to maintain the current speed of the vehicle 100 while traversing the slope 118. The torque demand model uses the effective GVW/GVM and the speed modify to a torque demand curve to determine the torque to maintain and/or accelerate to that speed. The slope data shifts the torque demand curve to affect the torque to maintain and/or accelerate to that speed. For example, if the vehicle 100 is traveling on a flat road (such as the road 116 in FIG. 1A) at 63 kilometers per hour (kph) (40 miles per hour (mph)), the torque demand model produces a first torque demand value. In that example, if the vehicle 100 is traveling on a 40 grade rode (such as the road 116 of FIG. 1B) at 63 kph, the torque demand model produces a second torque demand value higher than the first torque demand value. The effective GVW/GVM also affects the torque demand curve.

The throttle adjuster 306 begins to instruct the throttle control 120 to adjust the torque produced by the engine 104 and/or the powertrain control 124 to adjust the torque on the wheels 108 before the vehicle 100 reaches the slope 118 so that when the vehicle 100 reaches the slope 118, the vehicle 100 (a) has sufficient torque to ascend the slope 118 without slowing down, or (b) has sufficient torque to maintain the current speed when the road 116 changes from the slope 118 to be relatively flat. For example, the throttle adjuster 306 may start gradually increasing the throttle and/or the powertrain 150 meters (0.09 miles) before the vehicle reaches the slope 118 detected by the road geometry component 302.

Figure 4:
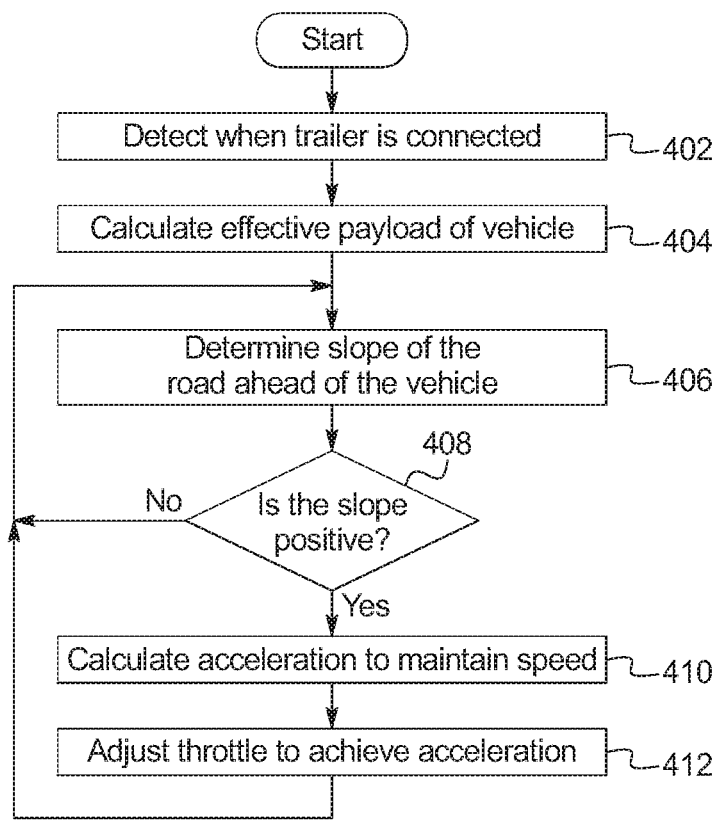
FIG. 4 is a flowchart of an example method to assist ascending a hill that may be implemented by the electronic components of FIG. 2.

FIG. 4 is a flowchart of an example method to assist ascending a hill that may be implemented by the electronic components 200 of FIG. 2. Initially, the trailer connection detector 300 determines whether the trailer 112 is connected to the vehicle 100 (block 402). For example, the trailer connection detector 300 may detect a signal sent from the trailer 112 on the CAN bus 214. The vehicle payload component 304 determines the effective GVW/GVM of the vehicle 100 (block 404). For example, the vehicle payload component 304 may use the vehicle model to determine effective GVW/GVM of the vehicle 100 based on whether the trailer 112 is connected, the GVW/GVM of the vehicle 100, and the vehicle dynamics data received from sensors 208.

The road geometry component 302 determines the slope 118 of the road 116 ahead of the vehicle 100 (block 406). The road geometry component 302 receives map data for a distance (such as 250 meters, (0.16 miles), 500 meters (0.31 miles), etc.) ahead of the vehicle 100 to determine the slope 118 of the road 116. For example, the road geometry component 302 may determine that the slope 118 of the road 116 has a grade of five for the next 250 meters ahead of the vehicles and a grade of twenty after 250 meters. The road geometry component 302 determines whether a detected change of the slope 118 is positive (block 408). For example, if the grade of the road 116 changes from the grade of five to the grade of twenty, the road geometry component 302 determines the change of the slope 118 is positive. As another example, if the grade of the road 116 changes from the grade of twenty to the grade of five, the road geometry component 302 determines the change of the slope 118 is negative. If the change of the slope 118 is negative, the road geometry component 302 continues to determine the slope 118 of the road 116 ahead of the vehicle 100 (block 406).

If the change of the slope 118 is positive, the throttle adjuster 306 calculates acceleration to maintain the current speed (block 410). The throttle adjuster 306 calculates acceleration to maintain the current speed based on the torque demand model. The torque demand model calculates the torque to maintain the current speed when the vehicle 100 is ascending the slope 118 based on the effective GVW/GVM of the vehicle 100 from the vehicle payload component 304 and the slope 118 determined by the road geometry component 302. In some example embodiments, the throttle adjuster 306 determines when to start the acceleration based on (i) the change in the grade of the slope 118 and/or (ii) an acceptable increase in the RPM of the engine 104 when the vehicle 100 is ascending the slope 118. For example, to ascend a first slope 118, the throttle adjuster 306 may gradually increase the power provided by the engine 104 for 130 meters. As another example, to ascend a second slope 118 with a higher grade than the first slope, the throttle adjuster 306 may gradually increase the power provided by the engine 104 for 235 meters. The throttle adjuster 306 sends a signal to the throttle control 120 to adjust the throttle based on the acceleration calculated at block 410 (block 412). In some example embodiments, the throttle adjuster 306 may send multiple signals to gradually increase the torque supplied by the engine 104. The road geometry component 302 then continues to determine the slope 118 of the road 116 ahead of the vehicle 100 (block 406).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a trailer connection component configured to determine whether a trailer is connected to the vehicle;
    a road geometry component configured to determine a slope of a road on which the vehicle is driving;
    a vehicle payload component configured to determine a gross vehicle weight of the vehicle; and
    a throttle adjuster configured to adjust a throttle based on the gross vehicle weight to maintain a set speed, the throttle adjuster instructing the throttle to adjust a mechanical-force-to-throttle ratio to increase torque supplied by an engine of the vehicle with respect to a mechanical force on an acceleration pedal of the vehicle.

2. The vehicle of claim 1, wherein to determine whether the trailer is connected to the vehicle, the trailer connection component monitors a controller area network bus.

3. The vehicle of claim 1, wherein to determine the slope of the road on which the vehicle is driving, the road geometry component analyzes map data received from an electronic horizon unit, the map data including gradient data for a distance of the road ahead of the vehicle.

4. The vehicle of claim 1, wherein the road geometry component is configured to determine a distance at which the slope of the road changes.

5. The vehicle of claim 1, wherein the vehicle payload component uses a vehicle model to determine the gross vehicle weight of the vehicle.

6. The vehicle of claim 1, wherein to adjust the throttle, the throttle adjuster instructs the throttle open to a set point to increase torque supplied by an engine of the vehicle.

7. A method comprising:
determining a connection status of a trailer;
determining a slope of a road ahead of a vehicle;
calculating an effective weight of the vehicle based on (i) vehicle dynamics data and (ii) the connection status of the trailer; and
adjusting a throttle based on the effective weight of the vehicle and a grade of the slope to maintain a set speed when the vehicle is traversing the slope, wherein to adjust the throttle includes instructing the throttle to adjust a mechanical-force-to-throttle ratio to increase torque supplied by an engine of the vehicle with respect to a mechanical force on an acceleration pedal of the vehicle.

8. The method of claim 7, wherein determining the connection status of the trailer includes monitoring a controller area network bus.

9. The method of claim 7, wherein determining the slope of the road ahead of the vehicle includes analyzing map data received from an electronic horizon unit, the map data including gradient data for a distance of the road ahead of the vehicle.

10. The method of claim 7, wherein adjusting the throttle includes instructing the throttle open to a set point to increase torque supplied by an engine of the vehicle.

11. The method of claim 7, wherein determining the slope of the road ahead of the vehicle includes determining a distance at which the slope of the road changes.

12. The method of claim 11, wherein adjusting the throttle includes sending instructions to the throttle to gradually open to a set point over the distance at which the slope of the road changes.

13. The method of claim 7, wherein the slope of the road ahead of the vehicle is changing from a negative gradient to a substantially zero gradient.

14. A computer readable medium comprising instructions that, when executed, cause a vehicle to:
determine a connection status of a trailer;
determine a slope of a road ahead of the vehicle;
calculate an effective weight of the vehicle based on (i) vehicle dynamics data and (ii) the connection status of the trailer; and
adjust a throttle based on the effective weight of the vehicle and a grade of the slope to maintain a set speed when the vehicle is ascending the slope, wherein adjusting the includes instructing the throttle to adjust a mechanical-force-to-throttle ratio to increase torque supplied by an engine of the vehicle with respect to a mechanical force on an acceleration pedal of the vehicle.

15. The computer readable medium of claim 14, wherein to determine the slope of the road ahead of the vehicle, the instructions cause the vehicle to analyze map data received from an electronic horizon unit, the map data including gradient data for a distance of the road ahead of the vehicle.

16. The computer readable medium of claim 14, wherein to adjust the throttle, the instructions cause the vehicle to instruct the throttle open to a set point to increase torque supplied by an engine of the vehicle.

17. The computer readable medium of claim 14, wherein to determine the slope of the road ahead of the vehicle, the instructions cause the vehicle to determine a distance at which the slope of the road changes.

18. The computer readable medium of claim 17, wherein to adjust the throttle, the instructions cause the vehicle to send instructions to the throttle to gradually open to a set point over the distance at which the slope of the road changes.

19. A method comprising:
when a trailer is connected to a vehicle:
determining a slope of a road ahead of the vehicle using horizon map data;
calculating a mechanical-force-to-throttle ratio based on dynamics data of the vehicle and the trailer to maintain a set speed when the vehicle is traversing the slope; and
adjusting a throttle with the mechanical-force-to-throttle ratio to increase torque with respect to a mechanical force on an acceleration pedal of the vehicle.

* * * * *